United States Patent
Wang

Patent Number: 5,456,537
Date of Patent: Oct. 10, 1995

[54] BICYCLE HUB ASSEMBLY

[76] Inventor: Zong P. Wang, No. 123, Shih Mei Road, Ho-Mei Town, Chang Hua Hsien, Taiwan

[21] Appl. No.: 342,176
[22] Filed: Nov. 18, 1994
[51] Int. Cl.6 .................................................. F16C 13/00
[52] U.S. Cl. ............................................................. 384/545
[58] Field of Search ....................................... 384/545, 544; 301/105.1

[56] References Cited

U.S. PATENT DOCUMENTS

| | | | |
|---|---|---|---|
| 533,341 | 1/1895 | Boyle | 384/545 X |
| 627,962 | 7/1899 | Allen | 384/545 |
| 743,843 | 11/1903 | Elliott | 384/545 X |
| 3,858,942 | 1/1975 | Humlong | 301/105.1 |
| 3,871,710 | 3/1975 | Dian et al. | 384/545 |

Primary Examiner—Thomas R. Hannon
Attorney, Agent, or Firm—Charles E. Baxley

[57] ABSTRACT

A bicycle hub includes a hub shell having two annular portions formed in the ends. The annular portions each has an annular depression formed in the outer portion so as to form a tapered surface in the inner portion. Two bearing shells are engaged in the annular portions and each has a protruding flange for engaging with the annular portions so as to retain the bearing shells in place. The tapered surfaces of the hub shell are engaged with the bearing shells so as to support the bearing shells in place and so as to prevent the bearing shells from being broken.

1 Claim, 2 Drawing Sheets

BICYCLE HUB ASSEMBLY

BACKGROUND OF THE INVENTION

1. Field of the Invention

The present invention relates to a hub, and more particularly to a bicycle hub assembly.

2. Description of the Prior Art

A typical bicycle hub is shown in FIG. 4 and comprises a hub shell 90 having two annular portions 91 formed in the end portions thereof. Two sleeves 92 are engaged on the annular portions 91 and each includes a spoke flange 93 extended radially outward therefrom for engaging with spokes. Two bearing shells 94 are engaged in the annular portions 91 for engaging with ball bearings 95 and each includes a protruding flange 96 extended radially outward from the outer portion thereof for engaging with the annular portions 91 and the sleeves 92 so as to retain the bearing shells 94 in place. In assembling, the two bearing shells 94 will be forced toward each other by bolt member. However, the inner portions of the bearing shells 94 which are engaged with the bearings 95 are not suitably supported and will be subjected to great strength of the bearings 95 such that the bearing shells 94 are apt to be broken.

The present invention has arisen to mitigate and/or obviate the afore-described disadvantages of the conventional bicycle hub assemblies.

SUMMARY OF THE INVENTION

The primary objective of the present invention is to provide a bicycle hub assembly in which the bearing shell are suitably supported in order to be prevented from being broken.

In accordance with one aspect of the invention, there is provided a bicycle hub assembly comprising a hub shell including two end portions each having an annular portion formed therein, the annular portions each including an inner peripheral portion and an outer peripheral portion having an annular depression formed there in so as to form a first tapered surface in the inner peripheral portion, two sleeves engaged on the annular portions of the hub shell and each including a spoke flange extended radially outward therefrom, and two bearing shells engaged in the annular portions respectively and each including a protruding flange extended radially outward therefrom for engaging with the annular portions and the sleeve so as to retain the bearing shells in place, the bearing shells each including a second tapered surface formed therein for engaging with the first tapered surfaces of the annular portions. The first tapered surfaces of the annular portions further support the bearing shells in place so as to prevent the bearing shells from being broken.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
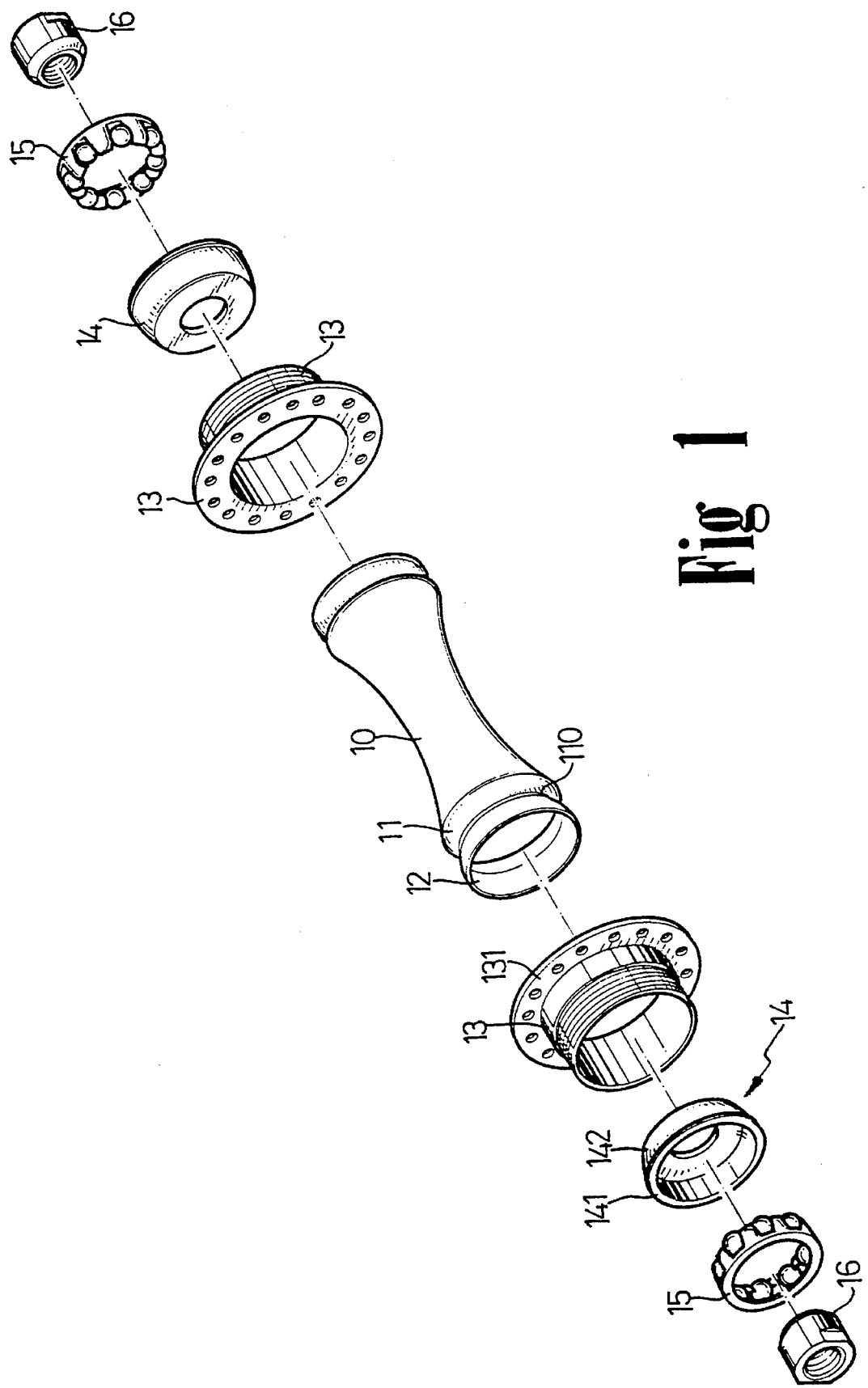
FIG. 1 is an exploded view of a bicycle hub assembly in accordance with the present invention.
Figure 2:
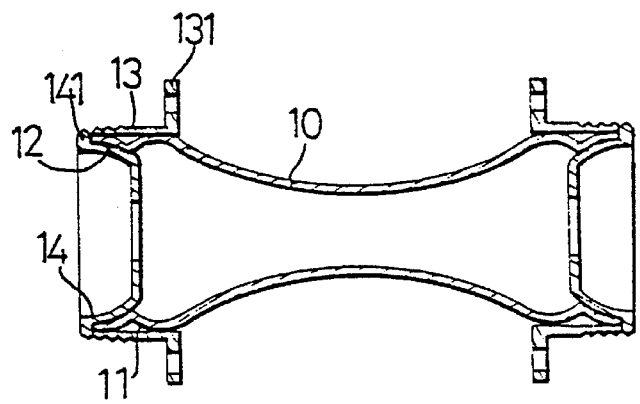
FIG. 2 is a cross sectional view taken along lines 2—2 of FIG. 3.
Figure 3:
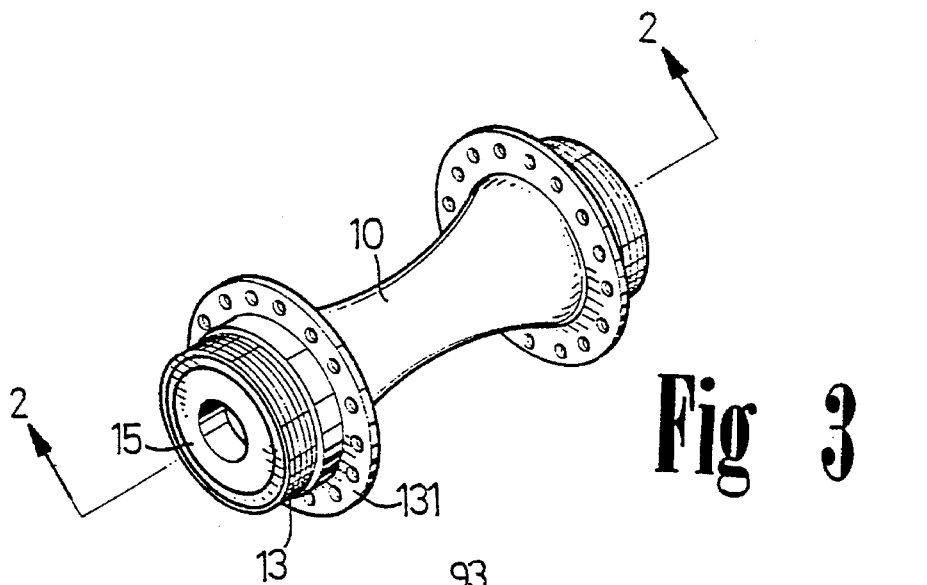
FIG. 3 is a perspective view of the bicycle hub assembly.
Figure 4:
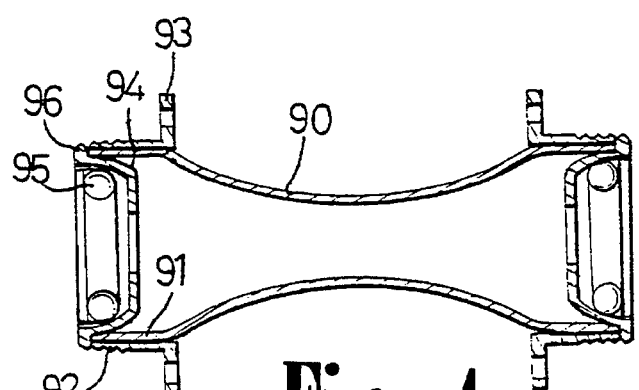
FIG. 4 is a cross sectional view of a typical bicycle hub assembly.

Referring to FIGS. 1 to 3, a bicycle hub assembly in accordance with the present invention comprises a hub shell 10 including two annular portions 11 formed in the end portions thereof, the annular portions 11 each including an annular depression 110 formed in the outer peripheral portion so as to form a tapered annular surface 12 in the annular portions 11. Two sleeves 13 are engaged on the annular portions 11 and each includes a spoke flange 131 extended radially outward therefrom for engaging with spokes. Two bearing shells 14 are engaged in the annular portions 11 respectively for engaging with bearings 15 and each includes a protruding flange 141 extended radially outward from the outer portion thereof for engaging with the annular portions 11 and the sleeves 13 so as to be maintained in position. Two nuts 16 are engaged with the bearings 15 and are engaged with a bolt (not shown) which forces the two nuts 16 toward each other so as to assemble the parts and elements in place.

It is to be noted that the bearing shells 14 each includes a tapered surface 142 for engaging with the tapered surfaces 12 of the annular port ions 11 such that the bearing shells 14 can further be supported in place by the tapered surfaces 12 of the hub shell 10, and such that the bearing shells 14 may be subjected to greater strength or force of the bearings 15. The bearing shells can be suitably supported and thus can be prevented from being broken.

Accordingly, the bicycle hub assembly in accordance with the present invention includes two bearing shells which are further suitably supported in place by the tapered surface of the hub shell such that the bearing shells can be prevented from being broken.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle hub assembly comprising:

a hub shell including two end portions each having an annular portion formed therein, said annular portions each including an inner peripheral portion and an outer peripheral portion having an annular depression formed therein so as to form a first tapered surface in said inner peripheral portion, two sleeves engaged on said annular portions of said hub shell and each including a spoke flange extended radially outward therefrom, and two bearing shells engaged in said annular portions respectively and each including a protruding flange extended radially outward therefrom for engaging with said annular portions and said sleeve so as to retain said bearing shells in place, said bearing shells each including a second tapered surface formed therein for engaging with said first tapered surfaces of said annular portions, said first tapered surfaces of said annular portions further supporting said bearing shells in place so as to prevent said bearing shells from being broken.

* * * * *